United States Patent [19]

Takigawa et al.

[11] 4,242,781
[45] Jan. 6, 1981

[54] VARIABLE CROWN SLEEVE ROLL

[75] Inventors: Toshiji Takigawa, Nishinomiya; Junichi Kida, Kohriyama, both of Japan

[73] Assignee: Sumitomo Metal Industries, Ltd., Osaka, Japan

[21] Appl. No.: 893,305

[22] Filed: Apr. 4, 1978

[30] Foreign Application Priority Data

Mar. 2, 1978 [JP] Japan .................. 53-23938

[51] Int. Cl.$^2$ .................. B21B 31/32; B60B 9/22
[52] U.S. Cl. .................. 29/113 AD
[58] Field of Search .......... 29/113 AD, 116 AD, 113

[56] References Cited

U.S. PATENT DOCUMENTS 3,457,617  7/1969  Noe et al. ................ 29/113 R
3,604,086  9/1971  Bretschneider ........... 29/113 AD

FOREIGN PATENT DOCUMENTS

1507837  11/1967  France ................. 29/113 AD
46-43978  12/1971  Japan .................. 29/113 AD

*Primary Examiner*—Wayne L. Shedd
*Attorney, Agent, or Firm*—Wenderoth, Lind & Ponack

[57] ABSTRACT

In a variable crown sleeve roll, the inner peripheral surface of a sleeve is sealingly secured at opposite ends to the opposite ends of the outer peripheral surface of an arbor to define a chamber of a predetermined shape therebetween in the central portion of the sleeve. A pressurized fluid is supplied to said chamber through a passage in the arbor to distend the sleeve so as to control the amount of the crown of the roll. Values of the smallest thickness of the sleeve at the axially central part of the sleeve, the length of the pressure receiving part of the sleeve and the sleeve thickness taper angle for defining said chamber are selected in accordance with predetermined conditions.

1 Claim, 15 Drawing Figures

VARIABLE CROWN SLEEVE ROLL

BACKGROUND OF THE INVENTION

The present invention relates to a variable crown sleeve roll and, more particularly, to an improved sleeve roll in which a chamber is defined between the outer peripheral surface of the arbor and the inner peripheral surface of the sleeve to permit control of the amount of expansion of the outer diameter of the roll by supplying a pressurized fluid to said chamber.

In the ensuing description, the amount of the diametrical expansion of the outer diameter of the roll is represented by the term "crown", the rolled steel plate is referred to as "strip", and the effect for making the thickness of the strip uniform and relieving the sharp local variation in the rolling pressure is referred to as the "softening effect".

In a rolling operation such as cold rolling, as generally known, since the rolls are subject to an extremely large rolling load which is applied to the rolls through bearings at the opposite ends thereof, the axes of the upper and the lower rolls are curved outwardly at the central portions of their lengths when a strip is held between the rolls, with the result that the rolled strip is thicker in the central region, in the duration of its width, than in other regions. In order to compensate for the curvature of the axes of the rolls and to make the strip thickness uniform, it is conventional to make the rolls by a method generally referred to as "crowning" in which each of the rolls is formed in a barrel-shape by progressively increasing the outer diameter of the roll from the opposite axial ends toward the central portion. The roll crown according to the conventional crowning method, has, however, a serious disadvantage in that the amount of the roll crown once determined in accordance with a certain rolling condition is not adjustable in response to changes in the rolling conditions or in the width of the strip being rolled.

This disadvantage has been overcome by a sleeve roll disclosed in Japanese Patent Application No. 18575/75 (Japanese Published Application No. 92770/76), in which the amount of the crown is variable and which has a softening effect. In this roll, a sleeve has the inner peripheral surface fitted on the peripheral surface of, an arbor and sealing means and securing means are provided at opposite ends of the fitting surface, step portions are machined in the inner peripheral surface of the sleeve or the outer peripheral of the arbor or both in the central portions of the fitting surfaces to define a sealed cylindrical chamber therebetween, and a fluid passage comprising a bore extending from an end face of the arbor therethrough and bores branching from said bore and extending to said sealed cylindrical chamber are provided.

The first characteristic of the operational effect of the roll disclosed by said Japanese Patent Application No. 18575/75 is that the sealed cylindrical chamber formed with the stepped portion thereabout substantially parallel to the fitting surfaces (in other words, the height of the stepped portion is constant with respect to the axial direction of the roll) can be supplied with a pressurized fluid, preferably oil, from outside through a rotary connection connected to the fluid passage to thereby elastically deform the outer peripheral surface of the sleeve so as to control the amount of the crown by adjusting the pressure of said fluid.

The second characteristic of the operational effect of said roll is that when some flaw such as a ridge-like local projection exists on the surface of the strip (heretofore such a projection was crushed flat by pressure and caused ridge buckles in the strip due to a difference extending in the rolling direction in the uneven region) the surface of the roll is depressed at the position corresponding to the projection on the strip because of the softening effect to relieve the sharp local variation of the linear pressure between the upper and the lower rolls with the strip therebetween to thereby roll the strip uniformly flat.

The roll disclosed in said Japanese Patent Application No. 18575/75 has the curvature of the crown substantially flat in a relatively wide range from the center of the width of the roll toward the opposite ends thereof.

After extensive research on the relationship between the crown of the roll and the shape of the strip produced thereby, the inventors have found that for a roll to produce a strip of a uniform thickness it is of a vital importance that the roll crown have a curvature in which the size of the substantially flat portion in the center of the width of the roll is reduced.

Japanese Patent Application No. 133312/75 (Japanese Published Application No. 57065/77) discloses an improved sleeve roll the shape of which is based on the above-described finding in which the sleeve has a progressively decreasing thickness from the opposite ends toward the center thereof or, in other words, the radial dimension of the sealed chamber progressively increases from the opposite ends toward the center thereof.

Further research by the inventors has revealed that a strip cannot be rolled into a satisfactory shape unless the sleeve thickness, the sleeve thickness taper angle, and the internal pressure receiving length are designed within certain limitations in accordance with the rolling conditions such as the cross sectional shape of the slab, the width of the strip, and the rolling load.

Accordingly, an object of the present invention is to provide a sleeve roll capable of providing the optimum control of the roll crown and producing the optimum softening effect in accordance with the rolling conditions.

SUMMARY OF THE INVENTION

In a sleeve roll according to the present invention, a sleeve has the inner peripheral surface thereof sealingly secured at opposite ends to the outer peripheral surface of an arbor at opposite ends thereof to define a chamber having a predetermined shape therebetween at the central portion, and a pressurized fluid is supplied to said chamber through a fluid passage provided in the arbor to thereby control the amount of the crown of the roll. The shape of said chamber is determined by selecting the minimum thickness of the sleeve at the axial center thereof, the pressure receiving length of the inner peripheral surface of the sleeve, and the sleeve thickness taper angle so as to satisfy the condition formulas.

The longitudinal section of the sleeve wall defining the chamber of the predetermined shape is formed basically by straight lines, but it may also be an arc, or a sine curve, or a combination of such curves and straight lines. When any of these curves is used, it is preferable that the maximum deflection of such curve from the original straight lines be selected to one tenth or less of the maximum thickness of the sleeve wall.

BRIEF DESCRIPTION OF THE DRAWINGS

The invention will be better understood from the following description taken in connection with the accompanying drawings, in which.

DESCRIPTION OF THE PREFERRED EMBODIMENTS

Figure 1:
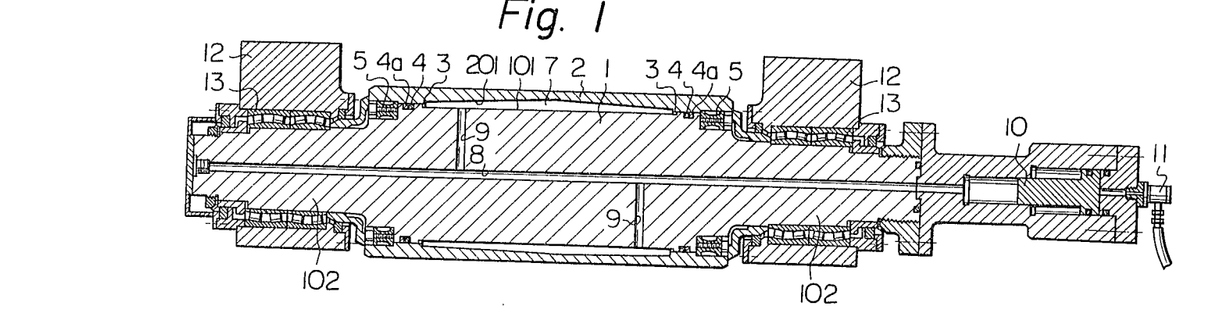
FIG. 1 is a longitudinal sectional view of the sleeve roll according to the present invention.

Certain preferred embodiments of the present invention will now be described with reference to the drawings. In FIG. 1 there is shown a schematic structure of the sleeve roll according to the present invention. In this roll, a sleeve 2 has the opposite ends of the inner peripheral surface tightly fitted on the opposite ends of the outer peripheral surface of an arbor 1 with O-rings 4 and back-up rings being provided in grooves in the contacting surfaces 3 and system ring feeders 5 being provided for securing the sleeve 2 to the arbor 1. Conventional shrink fitting can be utilized as the securing means 5 in place of said system ring feeders 5. The arbor 1 is provided with a stepped portion therearound extending in the axial direction in the central outer peripheral surface 101. The sleeve 2 is provided with a tapered stepped portion thereabout in the central inner peripheral surface 201, in the thickness of the sleeve 2 progressively decreasing toward the axial central portion thereof. Thus, a sealed chamber 7 having a predetermined shape is defined between the central outer peripheral surface 101 of the arbor 1 and the central inner peripheral surface 201 of the sleeve 2. In the arbor 1 there is formed a fluid passage comprising a bore 8 extending from an end face of the arbor 1 along the central axis thereof and bores 9 branching from said bore 8 and extending to the sealed chamber 7. The arbor 1 is supported at its journals 102 of rolling mill in conventional bearings 13 in roll chocks 12. A conventional pressure increasing means in the form of a piston 10 in a cylinder is connected to an end of the bore 8 constituting the fluid passage. The means 10 is operated by pressurized fluid from outside the roll and supplied through a conventional rotary connection 11.

Figure 2:
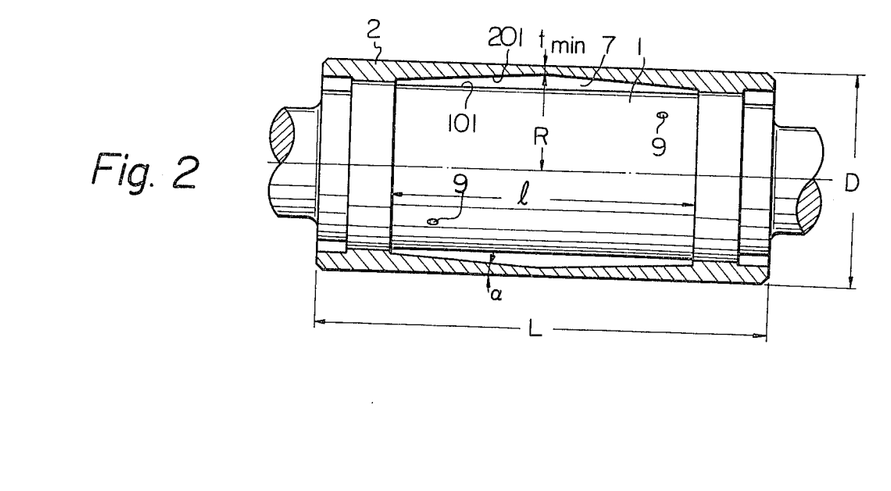
FIG. 2 is a longitudinal sectional view illustrative of the shape of the sleeve.

Referring now to FIG. 2, conditions determining the predetermined shape of the sealed chamber 7 will be described.

Dimensions of various component parts of the sleeve roll shown in FIG. 2 and rolling conditions under which it is used are defined as follows:

R: Average radius of the sleeve at the central axial position thereof (mm)

D: Outer diameter of the sleeve, or diameter of the roll (mm)

t min: Minimum thickness of the sleeve at the axially central axial position thereof (mm)

L: Overall length of the sleeve, or roll barrel length (mm)

l: Pressure receiving length of the sleeve (mm)

α: Sleeve thickness taper angle (degrees)

W: Rolling load (kg)

B: Length of the roll to contact the width of the steel strip to be rolled (mm) (hereinafter simply width of the rolled strip);

q: Unit length rolling load (W/B) (kg/min)

P: Pressure of the fluid (kg/mm²)

The minimum thickness t min of the sleeve, the pressure receiving length l of the sleeve, and the sleeve thickness taper angle α are determined by the following formulas (1), (2) and (3), respectively:

$$0.3\sqrt{R\frac{q}{P}} \leq t\,min \leq \sqrt{R\frac{q}{P}} \quad (1)$$

$$B - D/4 \leq l \leq L - D/2 \quad (2)$$

$$1° \leq \alpha \leq 5° \quad (3)$$

I. Determination of the Sleeve Thickness

When the sleeve thickness is too small, the sleeve concavity becomes too large and the inner peripheral surface of the sleeve is brought into contact with the outer peripheral surface of the arbor so as to make the rolling operation impossible. On the other hand, when the sleeve thickness is too large, the sleeve concavity becomes so small that the effect is the same as that of a solid roll so as to make the softening effect disappear. Accordingly, there must be an upper and a lower limit of the sleeve thickness.

The roll profile (or the strip width distribution) δ(x) during the rolling operation is the sum of the roll axis deflection $Y_B(x)$, the initial roll crown $Cr(x)$, the roll crown $Y_C(x)$ produced by the pressure within the chamber, and the roll concavity $Y_D(x)$ due to the rolling load. This relationship is expressed by the following equation:

$$\delta(x) = Y_B(x) + Cr(x) + Y_C(x) + Y_D(x)$$

where x is the co-ordinate in the roll axis direction.

Figure 3:
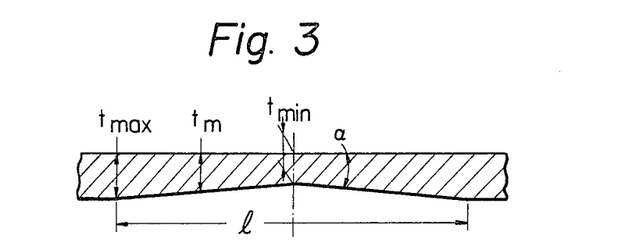
FIG. 3 is a fragmentary longitudinal sectional view of part of the sleeve of FIG. 2.

Assuming that the roll axis deflection $Y_B(x)$ is compensated by the initial roll crown $Cr(x)$, the uniform thickness in the width direction is obtained by the crown control effect when $Y_C(x) > Y_D(x)$. Since it is impossible to mathematically represent the crown and the concavity as functions of x because of the taper angle, the sleeve is approximated to a cylinder of a mean thickness $t_m$ (the mean value of the minimum thickness t min and the maximum thickness t max) as shown in FIG. 3 and the value of the mean thickness $t_m$ is determined.

Figure 4:
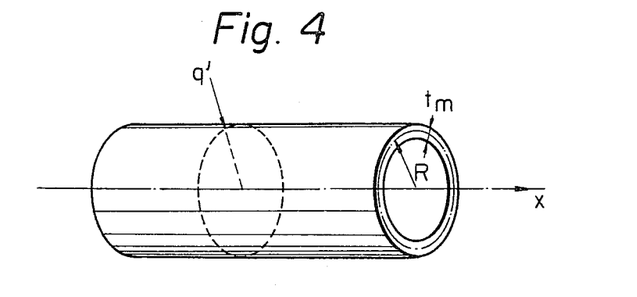
FIGS. 4 and 5 are perspective views of the embodiments in which the sleeves are replaced by approximate circular cylinders.

According to Formulas for Stress and Strain (R. J. Roark; McGraw-Hill Book Company, Inc.; 1938), the concavity $Y_D(x)$ produced when a concentrated load $q'$ acts on a cylinder of a mean radius R and a thickness $t_m$ as shown in FIG. 4 is represented by the following formula (4):

$$Y_D(x) = \frac{0.135 q' R^2}{E t^3_m} e^{-ax}(\cos ax + \sin ax) \quad (4)$$

where $a = 0.3125/R$

Figure 5:
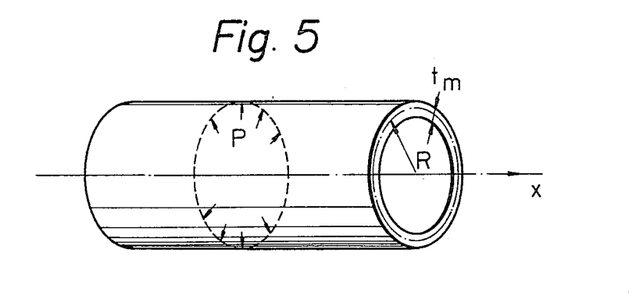

E: modulus of longitudinal elasticity On the other hand, the crown $Y_C(x)$ due to inner pressure P as shown in FIG. 5 is represented by the following formula (5):

$$Y_C(x) = \frac{PR^2\lambda}{2E t_m} e^{-\lambda x}(\cos\lambda x + \sin\lambda x) \quad (5)$$

where $$\lambda = \left\{ \frac{3(1-\mu^2)}{\gamma^2 t^2_m} \right\}^{\frac{1}{4}}$$

$\nu$: Poisson's ratio

When the load is distributed along the axial direction of the cylinder, the concentrated load $q'$ of the formula (4) is replaced by $qdx$ and integrated by the width of the strip to be rolled, and the formula (5) is integrated by the length of the pressure receiving part of the cylinder so that the constants are determined which satisfy the boundary conditions of the opposite ends (which are nearly fixed in the roll according to the present invention).

The maximum values $Y_D$max and $Y_C$max of the concavity $Y_D(x)$ and the crown $Y_C(x)$, respectively, are expressed for the central axial position of the roll by the following formulas:

$$Y_D\text{max} = \alpha \frac{q}{E} \left(\frac{R}{t_m}\right)^3 \quad (4')$$

$$Y_C\text{max} = \beta \frac{PR^2}{E t_m} \quad (5')$$

where $\alpha$ and $\beta$ are constants determined by the dimensions of the cylinder, the distribution length of the load, and the boundary conditions.

In order to obtain a uniform thickness in the direction of the width of the rolled strip, at least the maximum crown $Y_C$max must satisfy the following relationship:

$$Y_C\text{max} > Y_D\text{max}$$

Accordingly, the mean thickness tm is represented by the following formula:

$$tm > K\sqrt{R\frac{q}{P}} \quad (K = \sqrt{\frac{\beta}{\alpha}}, \text{constant})$$

The inventors have experimented with various sleeve thicknesses to determine sleeve stress for the values of R, tm, P, and q and have found that in order to obtain sufficient fatigue strength the value K must be $K \leq 0.3$. Accordingly, the mean sleeve thickness tm must be predetermined to satisfy the following formula:

$$tm \geq 0.3\sqrt{R\frac{q}{P}}$$

The inventors have found through the experimental rolling operations that when the mean sleeve thickness is in the range:

$$tm > \sqrt{R\frac{q}{P}}$$

the softening effect is substantially the same as that of a solid roll (the sleeve thickness is too large and the local concavity effect of the roll disappears). Accordingly, the mean sleeve thickness must be predetermined to satisfy the following formula:

$$0.3\sqrt{R\frac{q}{P}} < tm < \sqrt{R\frac{q}{P}}$$

However, since the roll becomes worn and the sleeve thickness decreases in proportion to the quantity of material rolled, for good roll strength the mean thickness tm in the above formula must be replaced by the minimum sleeve thickness t min and, accordingly, the sleeve must be designed to satisfy the following formula:

$$0.3\sqrt{R\frac{q}{P}} \leq t\text{ min} \leq \sqrt{R\frac{q}{P}}$$

II. Determination of the Pressure

Pressure Receiving Length of the Sleeve

Figure 6:
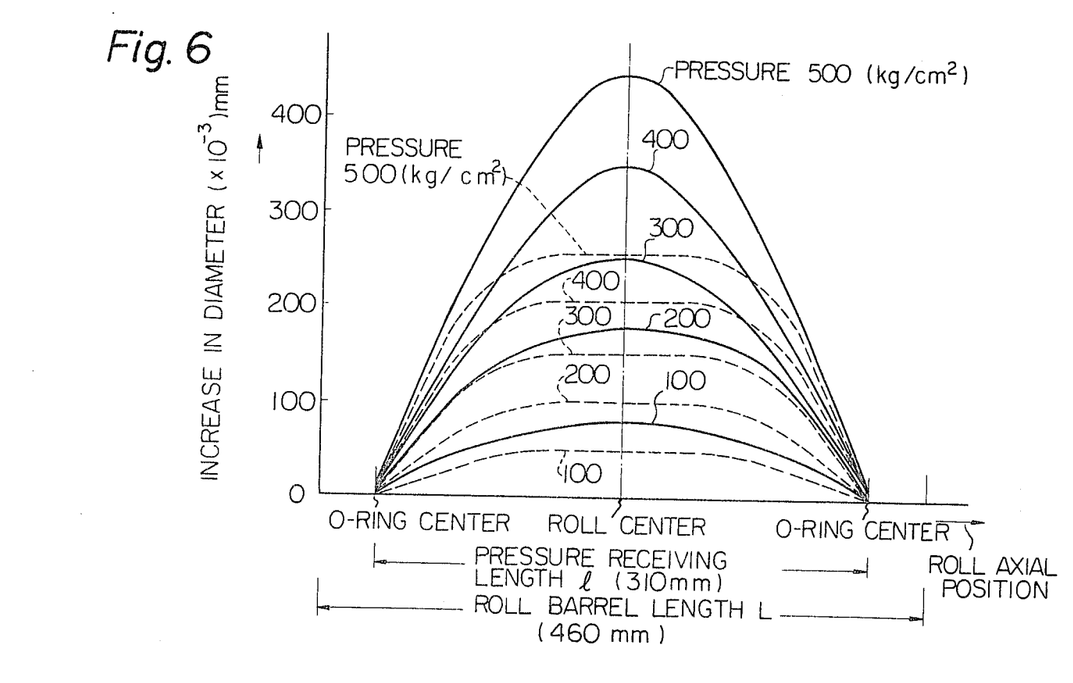
FIG. 6 is a graph showing the amount of crowning.
Figures 7, 8:
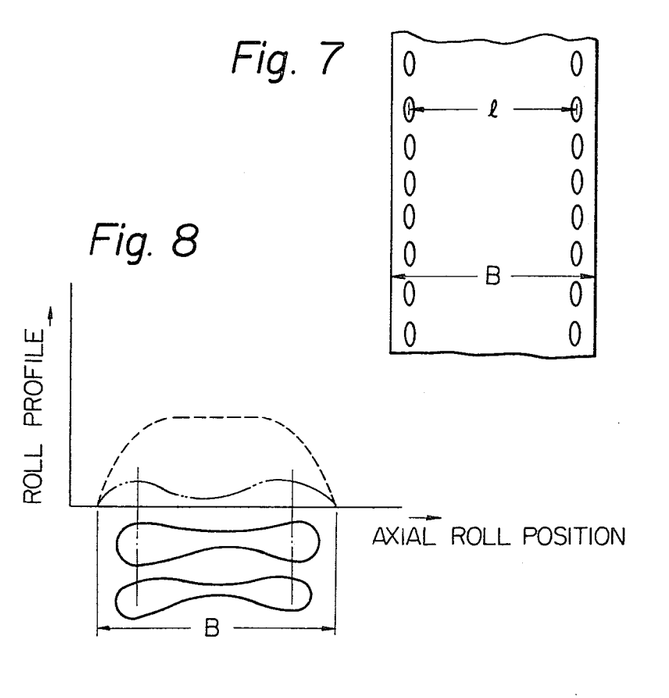
FIG. 7 is a plan view showing the shape of flaws in a rolled wide strip.
FIG. 8 is a diagram showing the shape of flaws produced when the taper angle of the sleeve is zero.

Since the roll crown shape becomes mathematically discontinuous as shown in FIG. 6 at the portions where the sleeve is secured to the arbor, it has heretofore been considered necessary that the width B of the strip be smaller than the pressure receiving length l of the sleeve. In fact, when a strip which has a considerably larger width B than the pressure receiving length l of the sleeve is rolled, the strip is locally extended as shown in FIG. 7 at the positions where the crown becomes discontinuous at the ends of the pressure receiving length l. It has been found, however, that when the strip width B is only a little larger than the pressure receiving length l, namely when the strip width is in the range $B \leq l + (D/4)$, there is no shape flaw caused in the strip. This is presumably because lateral flow of metal is caused more readily in the edge portions of the strip than in the central portion.

In the roll according to the present invention, the sleeve must be secured to the arbor by such means as a shrinkage fit, system ring feeders, or the like. In order to provide sufficient strength in the sleeve to withstand the rolling torque and to include high pressure sealing means therein, the pressure receiving length l of the sleeve must satisfy the relationship $l < L - D/2$. Therefore, the pressure receiving length l is determined by the following formula:

$$B - (D/4) \leq l \leq L - (D/2)$$

III. Determination of the Sleeve Thickness Taper Angle

When the taper is small, the roll crown takes any of the substantially trapezoidal forms shown by broken lines in FIGS. 6 and 8. When a rolling load is applied to the roll, the roll profile takes the form shown by two-dot chain line in FIG. 8 in which the top side of the trapezoidal shape shown by the broken line in FIG. 8 is made substantially concave to thereby roll the strip more in the portions approximately a quarter of the way in from the opposite edges of the strip than in other portions and cause shape flaw. In order to obviate this disadvantage, it is necessary to form the roll crown so that it has one of the smoothly curving shapes shown by solid lines in FIG. 6. For this purpose, the taper angle $\alpha$ must satisfy the condition $\alpha \geq 1°$.

Figure 9:
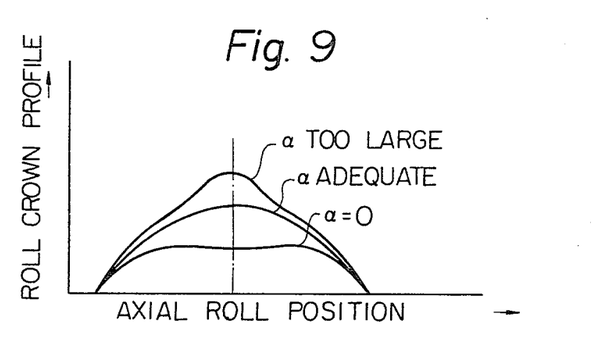
FIG. 9 is a graph showing the relationship of the change in the roll crown and the taper angle of the sleeve.

When the taper angle $\alpha$ is progressively increased under no-load condition and with the fluid pressure kept constant, the roll crown profile is gradually changed into the smoothly curved shape. When the taper angle $\alpha$ becomes too large, the roll crown profile is deflected from the smoothly curved shape to the shape shown in FIG. 9 in which the roll crown protrudes excessively in the central portion only. A roll with such crown profile rolls the strip more in the central portion in the width direction than in other portions to thereby cause a shape flaw known as center buckle. Therefore, the taper angle $\alpha$ must be limited to the range $\alpha \leq 5°$. Consequently, the taper angle $\alpha$ must be in the range $1° \leq \alpha \leq 5°$.

Figure 10A:
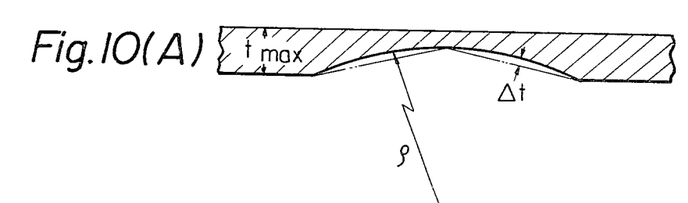
FIGS. 10(A) to 10(D) are fragmentary longitudinal sectional views of the sleeves of other embodiments which can be used for the taper angle of the sleeve.
Figure 10B:
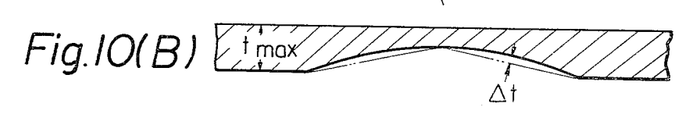
Figure 10C:
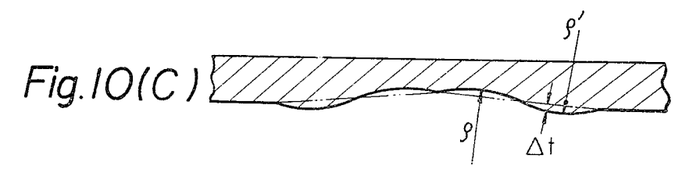
Figure 10D:
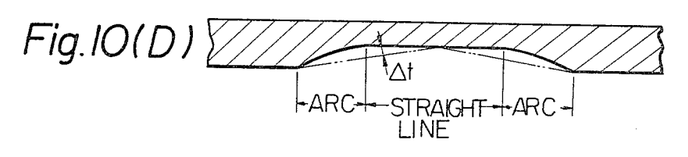
Figure 10E:
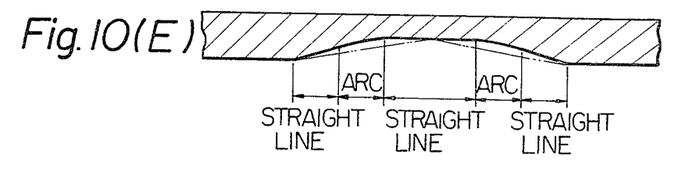

In accordance with the determinations of the sleeve thickness, the pressure receiving length, and the taper angle described above, the shape of the sleeve must be as shown in FIG. 3. The same results can be obtained when the rectilinear taper shape is replaced by an arc shape (radius P) or a sine curve shape in which the sleeve thickness is progressively reduced as shown in FIGS. 10(A) or 10(B), or by any of the shapes formed by combinations of arcs or arcs and straight lines as shown in FIGS. 10(C), 10(D) and 10(E). In these cases, when the deviation of each of said curves from the straight lines of the taper angle $\alpha$ is represented by $\Delta t$, the maximum value $\Delta t$max of the deviation $\Delta t$ must satisfy the following formula:

$$\Delta T\ max - 0.1\ t\ max$$

where t max is the maximum thickness of the sleeve.

Operational examples of the variable crown sleeve roll according to the present invention will now be described. A hot skin pass roll was made according to the specifications of Table 1.

TABLE 1

| | |
|---|---|
| Rolling Load (W) | 500 ton (max) |
| Internal Pressure (P) | 500 kg/cm² (max) |
| Rolled Strip Width (B) | 1300 mm (max) |
| Roll Diameter (D) | 825 mm |
| Roll Barrel Length (L) | 1980 mm |
| Pressure Receiving Length of Sleeve (l) | 1200 mm |
| Minimum Sleeve Thickness (t min) | 80 mm |
| Taper Angle ($\alpha$) | 3.34° |

Figure 11:
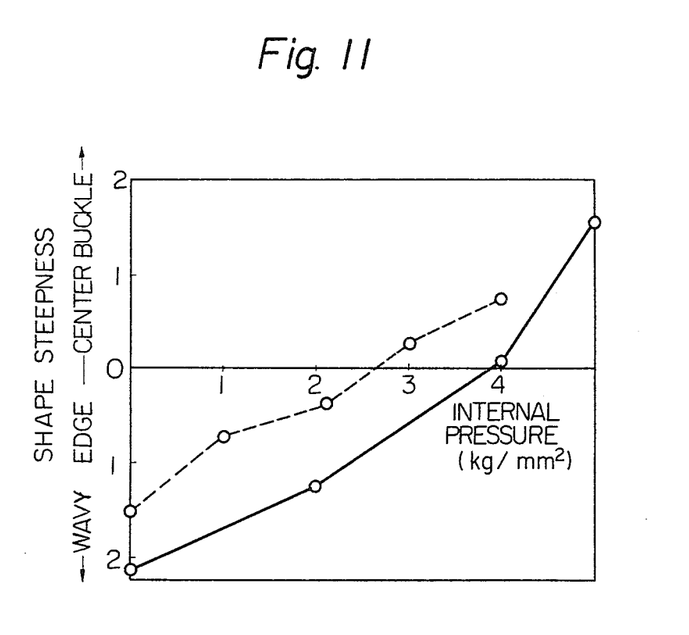
FIG. 11 is a graph showing the results of control of the rolling shape using the roll according to the present invention.

Two strips, one 3.2 mm thick × 1157 mm wide and the other 2.3 mm thick × 1231 mm wide, respectively, were rolled by said roll with the results shown in FIG. 11.

When the fluid pressure was zero, the roll flexed and the strip rolled by the roll was rolled more in the edge portions than in other portions to make wavy edges. However, as the roll crown was enlarged, the strip shape changed from one having the wavy edges to on having center buckle and at the adequate fluid pressure a satisfactorily flat strip was obtained. A ridge coil which would have caused ridge buckles when rolled by a solid roll was rolled into satisfactorily flat shape by the roll according to the present invention. Needless to say, the larger the minimum sleeve thickness t min the more advantageous the strength and the resistance to wear of the roll.

The present invention has advantages in industrial applications in that it not only makes the heretofore impossible shape control possible but also provides a softening effect. The roll according to the present invention need not necessarily be used for both the upper and the lower rolls of a rolling mill but may be used effectively for either one of them. In a four-high-roll mill, the roll according to the present invention may be used effectively not only as the work roll but also as the back up roll. The sleeve thickness need not change linearly. Satisfactory results are obtained when the sleeve thickness changes in a curve.

While we have shown and described specific embodiments of our invention, it will be understood that these embodiments are merely for the purpose of illustration and description and that various other forms may be devised within the scope of our invention, as defined in the appended claims.

What is claimed is:

1. A variable crown sleeve roll for rolling steel strip comprising an arbor, a sleeve having the opposite ends of the inner peripheral surface shrink fitted to the outer peripheral surface of said arbor for being sealingly secured thereto and the portion of said sleeve between said opposite ends defining with said arbor a chamber of a predetermined shape, said arbor having fluid passage means therein for supplying a pressurized fluid to said chamber to thereby control the amount of crown of said sleeve, the thickness of said sleeve being tapered along straight lines and decreasing from the opposite ends to the center, the optimum minimum thickness t min of the sleeve at the central axial portion thereof, the optimum pressure receiving length l of the sleeve, the optimum contact pressure p¹ between the sleeve and the arbor, and the sleeve thickness taper angle $\alpha$ being in accordance with the optimum formulas:

$$0.3\sqrt{R\frac{q}{P}} \leq t\ min \leq \sqrt{R\frac{q}{P}}$$

$$B - (D/4) \leq l \leq L - (D/2)$$

$$1° \leq \alpha \leq 5°$$

$$p^1 > p$$

wherein:

R is the average radius of the sleeve at the axially central position thereof
D is the outer diameter of the sleeve
L is the overall length of the sleeve
B is length of the roll to contact the width of the steel strip to be rolled
q is the unit length rolling load; and
P is the pressure of the fluid.

* * * * *